United States Patent [19]

Furuya

[11] Patent Number: 4,742,568

[45] Date of Patent: May 3, 1988

[54] RECEIVER FOR ANTENNA SWITCHING DIVERSITY SYSTEMS

[75] Inventor: Yukitsuna Furuya, Tokyo, Japan

[73] Assignee: NEC Corporation, Japan

[21] Appl. No.: 872,502

[22] Filed: Jun. 10, 1986

[30] Foreign Application Priority Data

| Jun. 10, 1985 | [JP] | Japan | 60-125430 |
| Jun. 10, 1985 | [JP] | Japan | 60-125431 |
| Aug. 26, 1985 | [JP] | Japan | 60-187084 |

[51] Int. Cl.$^4$ .............................................. H04B 1/10
[52] U.S. Cl. ................................... 455/277; 455/278; 455/135; 455/65
[58] Field of Search ............... 455/52.65, 133–135, 455/277, 278

[56] References Cited

U.S. PATENT DOCUMENTS

| 2,729,741 | 1/1956 | Chapman | 455/277 |
| 4,370,522 | 1/1983 | Takeda et al. | 455/277 |
| 4,397,041 | 8/1983 | Takeda et al. | 455/277 |
| 4,633,519 | 12/1986 | Gotoh et al. | 455/277 |

FOREIGN PATENT DOCUMENTS 2827572 12/1979 Fed. Rep. of Germany ...... 455/277

OTHER PUBLICATIONS

Diversity Techniques "Microwave Mobile Communications" 1974 pp. 399–401 John Wiley & Sons.

*Primary Examiner*—Michael A. Masinick
*Attorney, Agent, or Firm*—Leydig, Voit & Mayer

[57] ABSTRACT

A receiver comprising a switching circuit responsive to an antenna switching signal for switching between two antennas to produce a received signal, a noise estimating circuit for estimating the quantity of noise from the received signal, and an integrating circuit for integrating the noise to produce a first control signal which serves as the antenna switching signal.

11 Claims, 7 Drawing Sheets

RECEIVER FOR ANTENNA SWITCHING DIVERSITY SYSTEMS

BACKGROUND OF THE INVENTION

The present invention relates to a receiver for use in antenna switching diversity systems.

In radio communication, there is experienced a phenomenon known as fading, wherein electric field strength of received signals (referred to "field strength") is varied by the influence of radio wave reflections by buildings and hills, sometimes so intensely that wave reception is made totally impossible. One of the known techniques to cope with fading is called diversity reception, in which two antennas are provided so that reception can be achieved with one of them even if impossible with the other. Switching diversity systems, whose structure is simpler because only the antenna has to be duplicated but the receiver circuit does not, are especially effective for mobile communications, where equipment has to be particularly small. A prior art example of the switching diversity system is described in detail in Microwave Mobile Communications, 1974, John Wiley & Sons, pp. 399–401. The system described in the publication, however, involves the problem that antenna switching does not take place when the field strengths for both antennas become lower than the threshold.

SUMMARY OF THE INVENTION

An object of the present invention, therefore, is to provide a receiver for use in switching diversity systems, which overcomes the aforementioned disadvantage and can switch the antenna even when the field strength is low.

According to the invention, a receiver for use in switching diversity systems comprises a switching circuit responsive to a switching signal for switching between two antennas to produce a received signal. The receiver further comprises a detector for determining the amount of noise in the received signal and an integrator for accumlating the amount of noise and supplying the switching signal to the switching circuit when the accumulated value has surpassed a certain limit.

BRIEF DESCRIPTION OF THE DRAWINGS

The above and other objects, features and advantages of the present invention will become apparent from the following detailed description when taken in conjunction with the accompanying drawings in which.

DETAILED DESCRIPTION OF THE PREFERRED EMBODIMENTS

Figure 1:
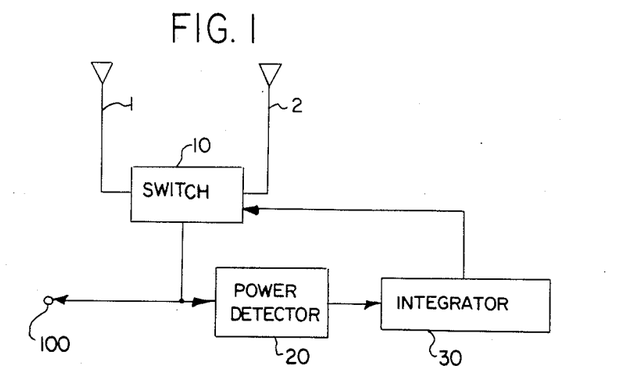
FIG. 1 is a block diagram illustrating a first preferred embodiment of the invention.

FIG. 1 is a block diagram illustrating a first preferred embodiment of the invention. Referring to the figure, an antenna switching circuit 10 switches between two antennas 1 and 2 in response to a switching signal from an integrator 30, which will be described below. A signal received by one of the antennas is supplied to a power detector 20, which estimates the power of noise in the received signal and feeds the estimated noise power to the integrator 30. The integrator 30 integrates the noise power and, when the integrated value reaches a certain limit, supplies the switching signal to the switching circuit 10.

Figure 2:
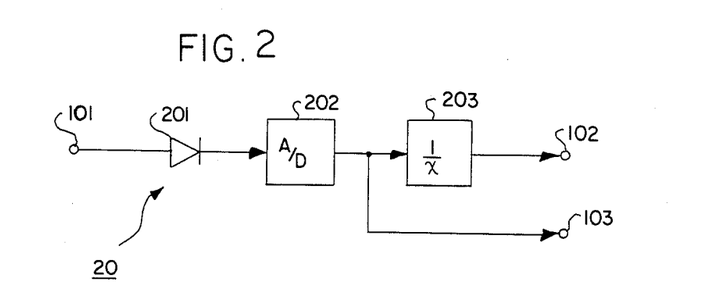
FIGS. 2 and 3 are circuit diagrams illustrating a power detector.

FIG. 2 shows an example of the power detector 20 in detail. The received signal supplied to an input terminal 101 from the switching circuit 10, after being detected by a detector 201, is converted into a received digital signal by an analog-to-digital (A/D) converter 202, and taken out of a terminal 103. A reciprocal calculator 203 calculates the reciprocal of the output of the A/D converter 202, and feeds the result to a terminal 102 as the noise power. This is based on the knowledge that, in a linear modulation process such as amplitude modulation, the noise power is proportional to the reciprocal of the received signal power.

Figure 3:
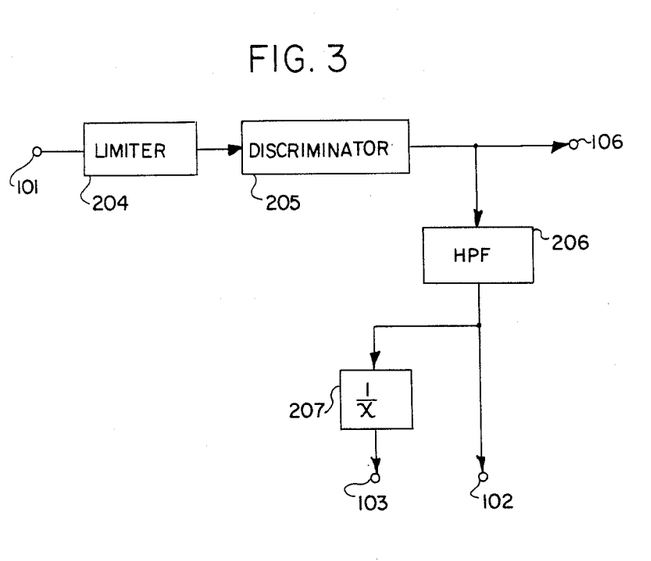

Meanwhile, a structure illustrated in FIG. 3, for example, can be used as a power detector for frequency modulated signals. Referring to the figure, the received signal given to a terminal 101 is supplied to a limiter 204, and then frequency-detected by a frequency discriminator 205. This is a commonly used method in FM communication. Removing the signal component from this output of the frequency discriminator 205 with a filter 206 gives the noise power. The field strength in this case is obtained as the reciprocal of the noise power. The received signal power and noise power obtained in this manner are outputted from terminals 103 and 102, respectively.

Figure 4:
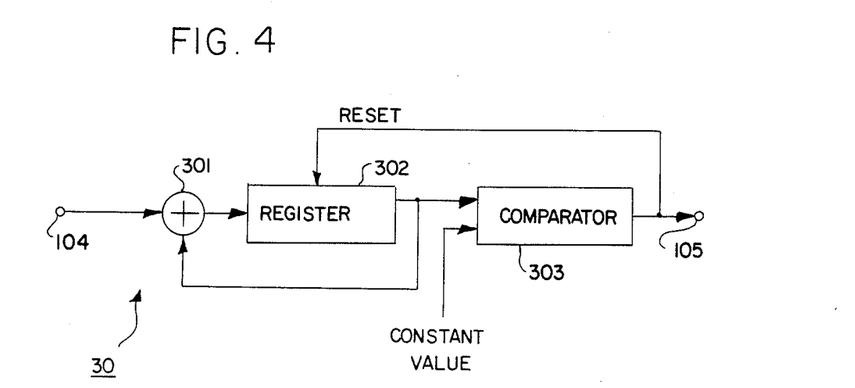
FIG. 4 illustrates an example of an integrator.

FIG. 4 is a circuit diagram illustrating the integrator 30 in detail. An adder 301 adds the noise power entered from an input terminal 104 to an integrated value stored in a register 302. A comparator 303 produces the switching signal from a terminal 105 when the integrated value from the register 302 surpasses a predetermined value. The content of the register 302 is reset by the switching signal.

Figure 5A:
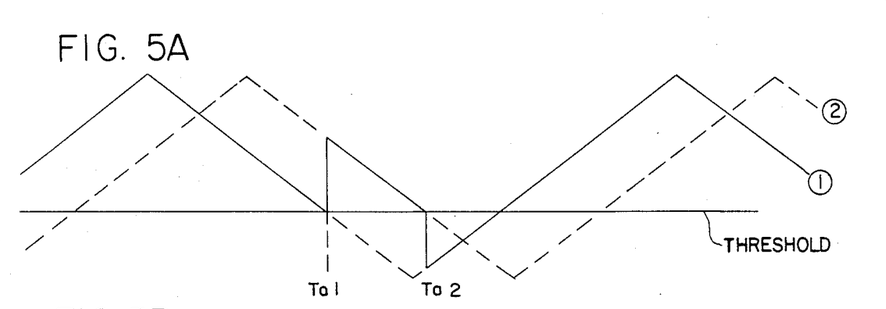
FIGS. 5A to 5C are diagrams for explaining the operation of the receiver of FIG. 1.
Figure 5B:
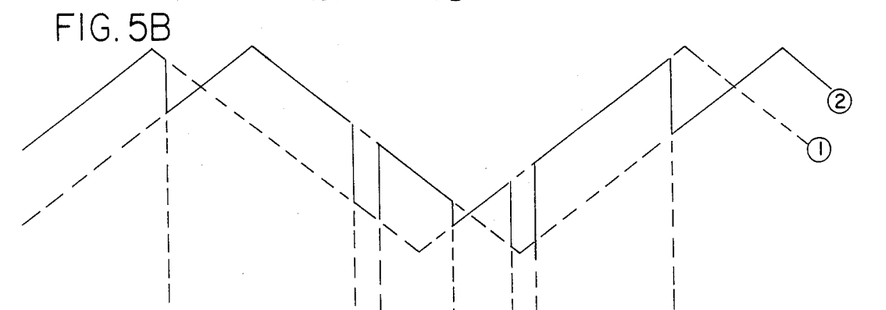
Figure 5C:
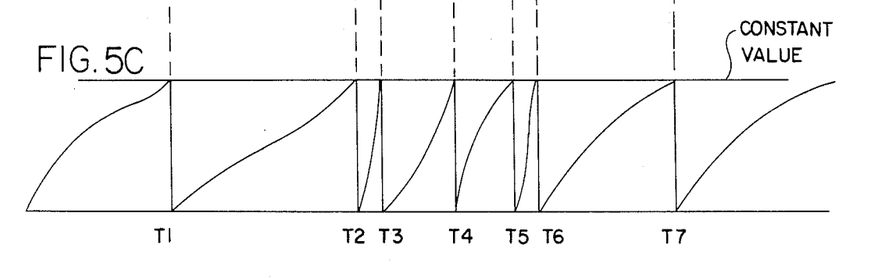

Next will be explained the operation of the first preferred embodiment shown in FIG. 1 with reference to FIGS. 5A to 5C. FIG. 5A shows the field strength of a prior art diversity receiver, and FIG. 5B, that of a diversity receiver according to the present invention. FIG. 5C shows the output of the register 302. In the description hereunder, it is supposed for the sake of brevity that electric fields received by antennas vary in a triangular wave shape. In FIGS. 5A and 5B, triangular waves 1 and 2 represent the magnitudes of the fields received from the antennas 1 and 2, respectively, and the thick solid line indicates the field strength actually obtained after diversity, while the broken line shows the field strength of the antenna which is not selected. These conditions will also apply to the waveform diagrams shown in FIGS. 7A and 7B for explaining the operation of the second preferred embodiment to be referred to afterwards.

First will be described the operation of a prior art diversity receiver with reference to FIG. 5A.

It is supposed that the antenna 1 is selected in the initial state. A received signal from the antenna 1 crosses a switching threshold downward at time $T_{a1}$, when antenna switching takes place to select the antenna 2. Then at time $T_{a2}$, the field strength of the antenna 2 also falls below the switching threshold, and switching takes place to select the antenna 1 again. Since the field strength at the antenna 1 at this time is already below the switching threshold, no more antenna switching takes place until the field strength at the antenna 1 rises and again crosses the switching threshold downward. Thus antenna switching is effective only between $T_{a1}$ and $T_{a2}$.

Next will be explained the operation of the diversity receiver according to the present invention with reference to FIGS. 5B and 5C.

It is also supposed that the antenna 1 is selected in the initial state. When the content of the registor 302 reaches a constant value at time T1, a switching signal is supplied by the integrator 30 to switch the antenna 1 to the antenna 2 and, at the same time, to reset the content of the registor 302.

The slope of the curves, shown in FIG. 5C, illustrating integrated values becomes gradually small while the received signal power is rising and, conversely, becomes gradually large as the received signal power falls. At time T2, the integrated value again reaches the constant value, and antenna switching takes place, this time to the antenna 1 whose field strength is smaller. In this case, however, the integrated value from the integrator 30 quickly rises and reaches the constant value because the field strength is small, so that switching soon takes place again at time T3. In this way, antenna switching takes place at a short interval when the field strength is small, and the better antenna is selected.

Figure 6:
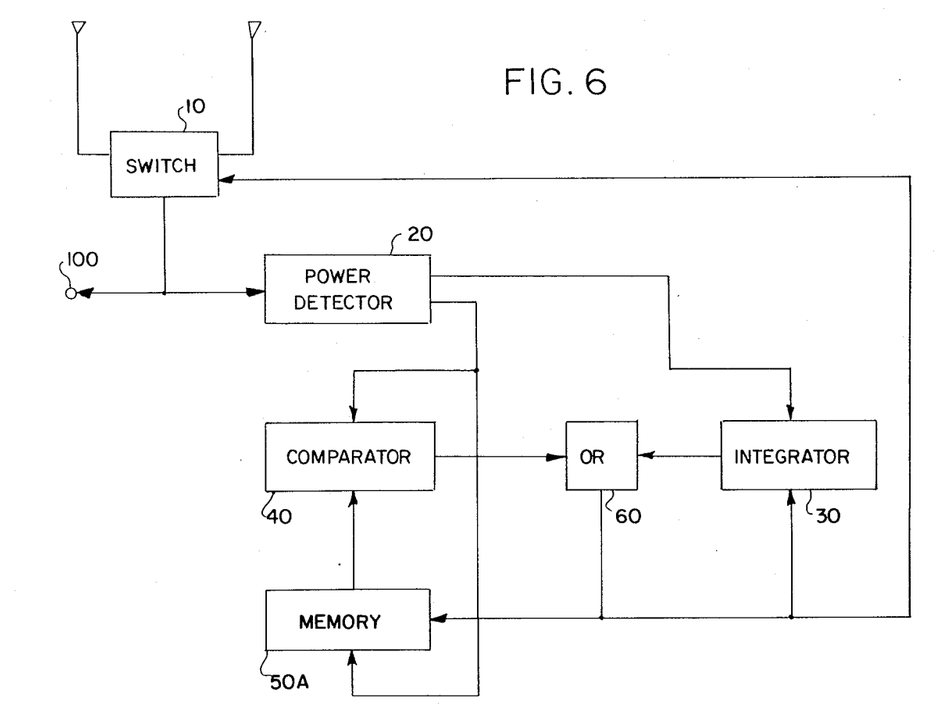
FIG. 6 is a block diagram illustrating a second preferred embodiment of the invention.

FIG. 6 is a block diagram illustrating a second preferred embodiment of the present invention, which is provided with an arrangement for switching the antennas according to a variable threshold. In FIG. 6, the received signal from the antenna switching circuit 10 is entered into the power detector 20, and at the same time outputted from a terminal 100 to a receiver section (not shown). A comparator 40 gives a switching signal to an OR gate 60 when the received signal is smaller than the signal level which is set as a threshold in a memory 50A. Meanwhile, a noise power determined by the power detector 20 is entered into the integrator 30, which integrates the noise and, when the integrated value reaches a constant value, outputs a switching signal to the OR gate 60. The OR gate 60 feeds the switching circuit 10 with a switching signal from either the comparator 40 or the integrator 30. The OR gate 60 also supplies the switching signal as an updating control signal to the memory 50A which stores the received signal in response to the control signal.

Next will be explained the operation of the second preferred embodiment of the invention with reference to FIGS. 7A to 7C.

Figure 7A:
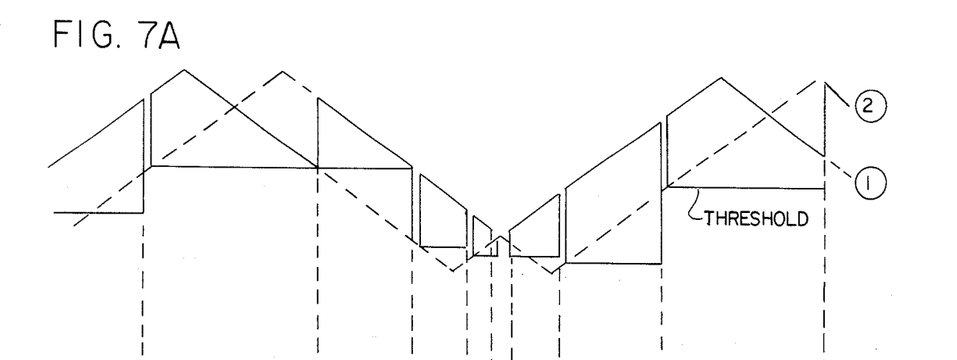
FIGS. 7A to 7C are diagrams for explaining the operation of the second preferred embodiment.
Figure 7B:
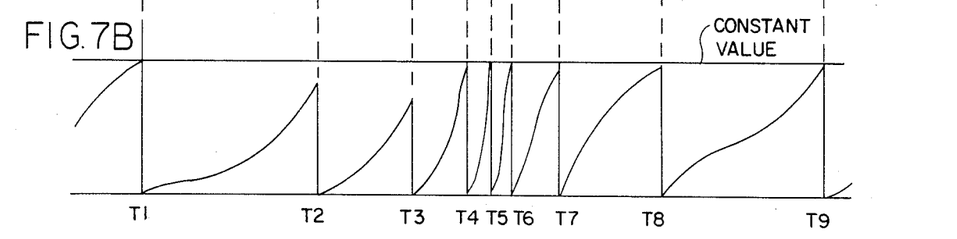
Figure 7C:
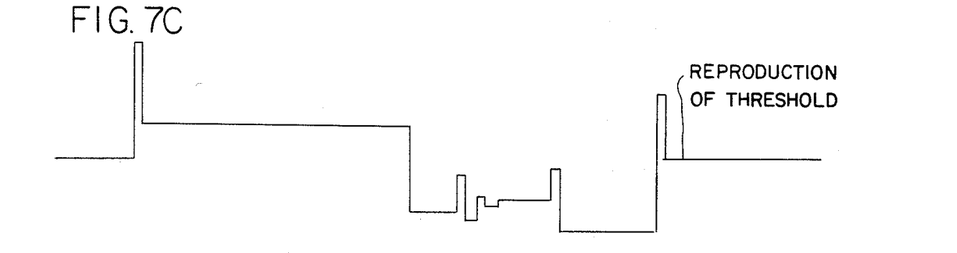

FIG. 7A illustrates reception fields for the antennas 1 and 2 and a threshold varying with the antenna switching and is helpful to understand the switching operation. However, in FIG. 7A, the trace of the threshold is simplified in the illustration because of the overlapping with the reception field curves. For this reason, a more precise trace of the threshold is reproduced in FIG. 7C. FIG. 7B shows a curve of integrated values of noise together with a straight line of the constant value.

The antenna 1 is supposed to be selected initially. As the content of the integrator 30 reaches the constant value at time T1, a switching signal is outputted from the integrator 30 to switch the antenna 1 to the antenna 2. At this time, the field strength at the antenna 1 is stored into the memory 50A to constitute a new threshold (FIG. 7C). However, since the field strength of the antenna 2 at time T1 is smaller than that of the antenna 1, antenna switching again takes place to select the antenna 1. The threshold at this time is the field strength of the antenna 2. Because the field strength of the antenna 1 is larger than the threshold, the antenna 1 continues to be selected. The content of the integrator 30 is reset at the time of antenna switching, and integration is restarted. As the field strength at the antenna 1 falls below the threshold at time T2, antenna switching takes place to select the antenna 2, and integrator 30 is reset to restart integration. At time T3 switching to the antenna 1 takes place as the field strength again falls below the threshold, but the field strength of the antenna 1 is smaller than that of the antenna 2, so that reswitching to the antenna 2 immediately takes place. Since the overall field strength has fallen off, integration of the noise is accelerated. At time T4, the integrated value in the integrator 30 reaches the constant value, and the integrator 30 outputs a switching signal to switch the antenna. However, as the field strength is smaller at the antenna 1, reswitching to the antenna 2 immediately takes place. The same sequence is repeated at time T5. At time T6, when the field strength is larger at the antenna 1, switching to the antenna 1 takes place. Thereafter, at times T7 and T8, the integrated value in the integrator 30 reaches the constant value and antenna switching takes place, but reswitching to the antenna 1 ensues because the field strength is larger at the antenna 1. At time T9, when the field strength is larger at the antenna 2, switching to the antenna 2 takes place. Immediate reswitching to the antenna of a stronger field after switching to the other antenna of a weaker field is the effect of the comparator 40, and the frequent switching, when the overall field strength has fallen off, to ensure early selection of the better antenna is the effect of th integrator 30.

As stated above, in the second embodiment of the invention, when the field strength is smaller than the threshold stored in the memory 50A, the output of the power detector circuit 20 is written into the memory 50A as a new threshold. With this structure, when the field strength gradually decreases, the switching threshold correspondingly lowers. However, when the field strength increases, the output of the power detector 20 is always higher than the threshold stored in the memory 50A, so that no switching signal is generated and the antenna having a greater field strength cannot be selected.

Figure 8:
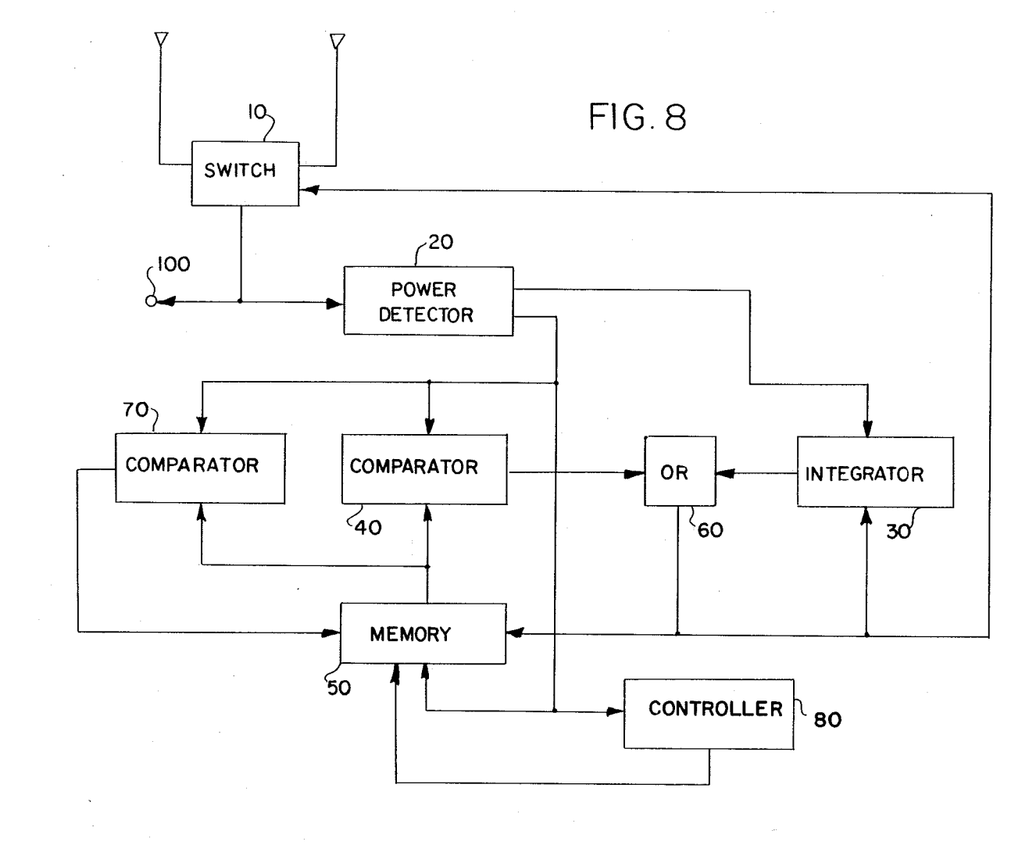
FIG. 8 is a block diagram illustrating a third preferred embodiment of the invention.

A third preferred embodiment of the invention, illustrated in FIG. 8, is so composed as to solve this problem. In FIG. 8, a second comparator 70, when the difference between the field strength and the threshold from a memory 50 surpasses a constant value (this constant value is hereinafter called the maximum level difference), provides a memory control signal to the memor 50. A controller 80 supplies the memory 50 with memory updating data, which is lower than the output of the power detector 20 by maximum level difference. The memory 50, in response to the memory control signal, stores the memory updating data as a new threshold from the controller 80.

Figure 9:
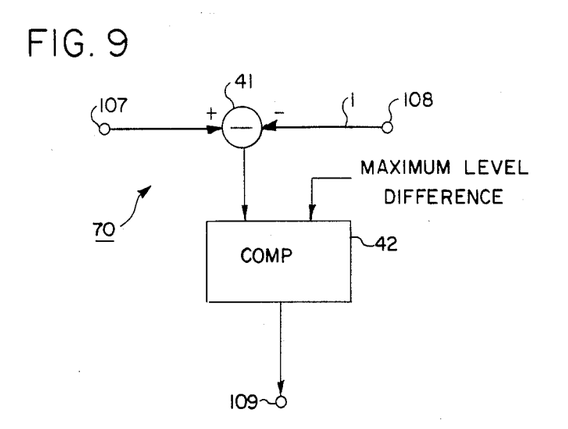
FIGS. 9 and 10 illustrate a comparator and a memory, respectively.

FIG. 9 illustrates an example of the second comparator 70. There are entered the received signal, which is the output of the power detector 20, and the threshold, which is stored in the memory 50, from input terminals 107 and 108, respectively. A subtractor 41 subtracts the threshold from the received signal. A comparator 42 outputs the memory control signal from a terminal 109 when the balance of subtraction is greater than the maximum level difference.

Figure 10:
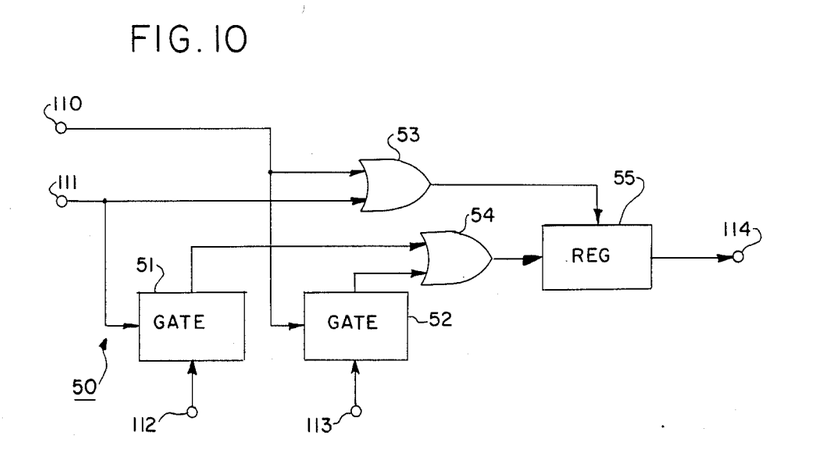

FIG. 10 illustrates one example of the memory. In the figure, a gate circuit 51 will output the updating data fed to a terminal 112 if the memory control signal is supplied to a terminal 111, and will output "0" in all other cases. A gate circuit 52 similarly supplies the output of the power detector 20 when the switching signal from a terminal 110 is "1". The outputs of the gate circuits 51 and 52 undergo logical addition by an OR gate 54, and the resultant logical sum is supplied to a register 55. Therefore, when the memory control signal is "1", the updating data is entered into the register 55, and when the switching signal is "1", the output of the power detector 20 is entered into the register 55. The content of the register 55 is reloaded by a reloading signal, which has been provided by an OR circuit 53 as the logical sum of the memory control signal and the switching signal. Therefore, as either the memory control signal or the switching signal is entered, the content of the register is reloaded. The content of the register 55 is outputted as threshold from a terminal 20.

As hitherto stated, according to the present invention, antenna switching is performed on the basis of the noise power and, therefore, is possible regardless of whether the reception field is strong or weak. Furthermore, according to the invention, the switching threshold is varied with changes in field strength to make it possible to always use the antenna having the strong reception field.

What is claimed is:

1. A receiver for use in switching diversity systems having at least two antennas for reception, comprising:
    switching means responsive to an antenna switching signal for switching between said two antennas to produce a received signal;
    noise estimating means for producing a first signal indicative of the quantity of noise in the received signal; and
    an integrating means adapted to respond to the first signal for integrating the noise to produce a first control signal as said antenna switching signal.

2. A receiver for use in switching diversity systems, as claimed in claim 1, wherein the receiver further comprises power detecting means for producing a second signal indicative of the power of the received signal and wherein the noise detecting means includes means for producing the first signal as the reciprocal of the second signal.

3. A receiver for use in switching diversity systems, as claimed in claim 2, wherein the power detecting means includes means for detecting the power of a linear modulated signal.

4. A receiver for use in switching diversity systems, as claimed in claim 2, wherein the power detecting means includes means for detecting the power of a frequency modulated signal.

5. A receiver for use in switching diversity systems, as claimed in claim 1, wherein the integrating means includes means for adding a plurality of first signals, means for comparing the sum to a predetermined value, and means for supplying the first control signal in accordance with a predetermined relationship between the sum and the predetermined value.

6. A receiver for use in switching diversity systems, as claimed in claim 5, wherein the integrating means includes means responsive to the first control signal for resetting the sum.

7. A receiver for use in switching diversity systems having at least two antennas for reception, comprising:
    switching means responsive to an antenna switching signal for switching between said two antennas to produce a received signal;
    noise estimating means for producing a first signal indicative of the quantity of noise in the received signal;
    an integrating means adapted to respond to the first signal for integrating the noise to produce a first control signal as said antenna switching signal;
    power detecting means for producing a second signal indicative of the power of the received signal from said switching means;
    memory means adapted to respond to the antenna switching signal for storing said second signal as a threshold signal for antenna switching;
    first comparator means for comparing said second signal with the threshold from said memory and for generating a second control signal when said second signal is smaller than the threshold from said memory means; and
    gating means responsive to said first and second control signals for producing said antenna switching signal.

8. A receiver for use in switching diversity systems, as claimed in claim 7, further comprising:
    second comparator means for comparing said second signal with the threshold from said memory means and for generating a memory control signal when said second signal is greater than the threshold from said memory means by a predetermined value, said memory control signal being applied to said memory as a write enabling signal; and
    threshold generating means responsive to said second signal for producing an updated threshold which is smaller than said second signal and is greater than the threshold of said memory means, said updated threshold being supplied from said controlling means to said memory means as said threshold for antenna switching.

9. A receiver for use in switching diversity systems, as claimed in claim 8, wherein the memory means comprises a memory circuit, first gate means responsive to said memory control signal for supplying the updated threshold to the memory circuit, and second gate means responsive to said switching signal for supplying said second signal to the memory circuit.

10. A receiver for use in switching diversity systems, as claimed in claim 9, wherein the memory circuit comprises a register.

11. A receiver for use in switching diversity systems, as claimed in claim 9, wherein the memory means includes means for gating the output of the first and second gate means into the memory circuit and means for gating said memory control signal and said switching signal to produce a memory circuit reloading signal.

* * * * *